United States Patent [19]
Bielas et al.

[11] Patent Number: 5,182,611
[45] Date of Patent: Jan. 26, 1993

[54] DIGITAL SYNTHETIC SERRODYNE FOR FIBER OPTIC GYROSCOPE

[75] Inventors: Michael S. Bielas, Phoenix; Tamim F. El-Wailly, Peoria, both of Ariz.

[73] Assignee: Honeywell Inc., Minneapolis, Minn.

[21] Appl. No.: 680,596

[22] Filed: Mar. 29, 1991

Related U.S. Application Data

[63] Continuation of Ser. No. 391,002, Aug. 9, 1989, abandoned.

[51] Int. Cl.$^5$ .................................. G01C 19/72
[52] U.S. Cl. .................................. 356/350
[58] Field of Search .................................. 356/350

[56] References Cited

U.S. PATENT DOCUMENTS 4,705,399 11/1987 Graindorge et al. ............ 356/350

FOREIGN PATENT DOCUMENTS 3104786 9/1982 Fed. Rep. of Germany ...... 356/350

OTHER PUBLICATIONS

"Double Closed-Loop Hybrid Fiber Gyroscope Using Digital Phase Ramp", Lefevre, 1984, pp. 1-4.
"Principle of the Digital Phase Ramp", Lefevre, pp. 1-3, 1984.

Primary Examiner—Samuel A. Turner
Attorney, Agent, or Firm—Robert A. Pajak

[57] ABSTRACT

A digital synthetic serrodyne phase difference controller for a rotation sensor capable of sensing rotation about an axis of an optical fiber coil based on having a pair of electromagnetic waves propagating through the optical fiber in opposite directions to both impinge on a photodetector with a phase difference relationship therebetween, the digital synthetic serrodyne phase difference controller including a positive serrodyne generator and a negative serrodyne generator having outputs which input to a common adder. The bit output of the adder is converted to analog in a digital-to-analog converter and applied to operate a frequency translating device in the optical path with the coil.

19 Claims, 6 Drawing Sheets

SYNTHETIC DIGITAL SERRODYNE MODULATOR

Fig. 1  SYNTHETIC DIGITAL SERRODYNE MODULATOR

Fig. 2 DIGITAL SYNTHETIC DUAL SERRODYNE INVENTION

Fig. 3

3-BIT DIGITAL SERRODYNE WAVEFORMS

DIGITAL SYNTHETIC SERRODYNE FOR FIBER OPTIC GYROSCOPE

This is a continuation of application Ser. No. 07/391,002, filed Aug. 9, 1989, now abandoned.

BACKGROUND AND SUMMARY OF THE INVENTION

This invention relates to optical gyroscopes in general and to a fiber optic gyro wherein a digitally synthesized serrodyne waveform is applied to a single phase-modulator in a closed-loop fiber optic gyroscope.

In fiber optic gyroscopes there exists an analogy to traditional electromechanical rate gyros in that either type may be operated "open-loop" or "closed-loop". The closed-loop configuration generally is associated with higher levels of precision than the open-loop type. In an open-loop gyro the basic device output is the direct measure of gyro input rate. In a closed-loop gyro the output is constantly maintained at null by means of an external feedback mechanism which acts to cancel the inertially sensed rotation. In the case of electromechanical gyros this feedback consists of applying a precision torque to the gyro's spinning rotor to maintain the alignment with the gyro case, the current needed to apply the correct torque thus becoming a measure of gyro input rotation. In the case of fiber optic gyros, the appropriate photodetector output current component is continuously maintained at null by the action of a differential phase shift transducer which exactly cancels the phase shift induced by the applied input rate (the "Sagnac" shift) to the two counterpropagation light beams within the fiber. The frequency of the signal voltage to the tranducer becomes the measure of gyro input rate.

In order to generate the differential phase shift, two basic approaches have been employed in the past. One involves the use of acousto-optic frequency shifters (e.g. Bragg cells) which directly change the optical carrier frequency of an input light beam by the amount of the applied signal voltage frequency. Another approach to phase-shifting a light beam is to employ a phase shifter which can vary or modulate the optical path length within itself by application of a signal voltage to it. These phase-shifters (which are several) may be fabricated so as to be an integral part of the fiber coil or formed with vibrating mirrors, or made in integrated optic form or formed by deposition of optically active material on optical fiber. To generate a differential beam phase shift equal and opposite to the Sagnac-induced (i.e. rate induced) phase shift, a special electrical periodic signal in the shape of a sawtooth (a serrodyne waveform) is applied to the phase shifter. The repetition rate of this periodic waveform then becomes the gyro output, along with an additional output to specify the direction of input rate (polarity).

A problem that arises with such a serrodyne modulator when gyro input rates are low is that it becomes difficult to generate the serrodyne voltage waveform. Another problem that arises is the gyro's ability to track rapid variations in input rates is limited. Both difficulties ultimately result in inaccurate gyro scale factor performance.

To overcome the problem of low input rate operation of a serrodyne-modulated fiber optic gyro, several approaches have been implemented in the past. One such approach is to generate variable voltage steps rather than a continuous voltage ramp. One disadvantage is the need to gate or switch out transient pulses. Such gating is a gyro output error source and complicates the electronics circuitry. Another disadvantage is a relatively complex electronics processor that is needed to generate the variable-height phase steps. Another disadvantage is that this method may impose a maximum rate magnitude beyond which the gyro output is not uniquely associated with its input or a limitation on the fiber coil diameter resulting in poor sensitivity.

Another approach to avoid the need to generate serrodyne waveforms at low gyro input rates is to apply a relatively high bias frequency serrodyne voltage to the phase modulator. A disadvantage is one earlier mentioned that in regard to maximum input rate limitation. In addition, this approach generates a large difference in interbeam optical carrier frequency at low gyro input rates resulting in poor gyro bias drift stability.

In a co-pending serrodyne system application Ser. No. 302,484 "Fiber Optic Gyroscope Plurality Modulators", assigned to the same assignee as the present invention, there is shown a serrodyne gyroscope using two serrodyne generators and two phase modulators, each modulator operating at fairly high frequencies irrespective of input rate, magnitude or direction. The two phase modulators operate as conventional baseband serrodyne modulators (pure frequency shifting) about a quiescent finite frequency in push-pull. The gyro output becomes the frequency difference between the signals applied to the two modulators. When two modulators are used a differential phase shifter mechanism evolves whereby the two light beams are phase-shifted with respect to each other in proportion to the difference in frequency of the two serrodyne waveforms as respectively applied to the two modulators. Thus any arbitrarily small phase shift (including zero) can be generated without requiring low-frequency voltage waveforms for either modulator by itself.

Another co-pending serrodyne system application Ser. No. 302,157 "Fiber Optic Gyroscope Combined Signal Phase Difference Control", assigned to the same assignee as the present invention, describes a synthetic single serrodyne modulator for fiber optic gyroscope which retains the advantages of baseband serrodyne (pure frequency shifting) and requires only one phase modulator. In synthetic serrodyne, the two serrodyne generators operating around a quiescent frequency are summed electronically along with the bias modulation and then applied to the single phase modulator. This co-pending case using a single phase modulator results in a more simple, more cost effective design and offers improvement in random rate noise, bias stability and a scale factor which is much improved over open-loop versions. The teaching of these two co-pending applications (to the extent necessary) is incorporated by reference herein.

In the present invention a digitally synthesized serrodyne waveform is applied to a single phase modulator in a closed-loop fiber optic gyroscope. The one phase modulator is operated as a baseband serrodyne frequency shifter. The applied serrodyne signal is synthesized from the digital summation of two binary words which are digital-to-analog converted and amplified. Only one op-amp is required. Reset time is minimized.

BRIEF DESCRIPTION OF THE DRAWINGS

FIG. 4 comprising FIGS. 4a, b and c is an electrical schematic diagram of portions of the block diagram of FIG. 1.

DESCRIPTION

In the digital synthetic serrodyne for fiber optic gyroscope of this invention there is a simplification of the system block diagram in that the output signals of the "up" counter and of the "down" counter of the positive and negative serrodyne generators, respectively, are connected to inputs of adder means. The output of the adder means is connected to a high speed digital-to-analog converter (DAC) and then to an amplifier having its output connected to drive the phase modulator. The advantages of this improved circuit include that only one high speed DAC and AMP are required. This gives faster reset times than any analog duplex or analog synthetic single serrodyne. Also it is all digital except for the phase sensitive demodulator, integrator and DAC.

Figure 1:
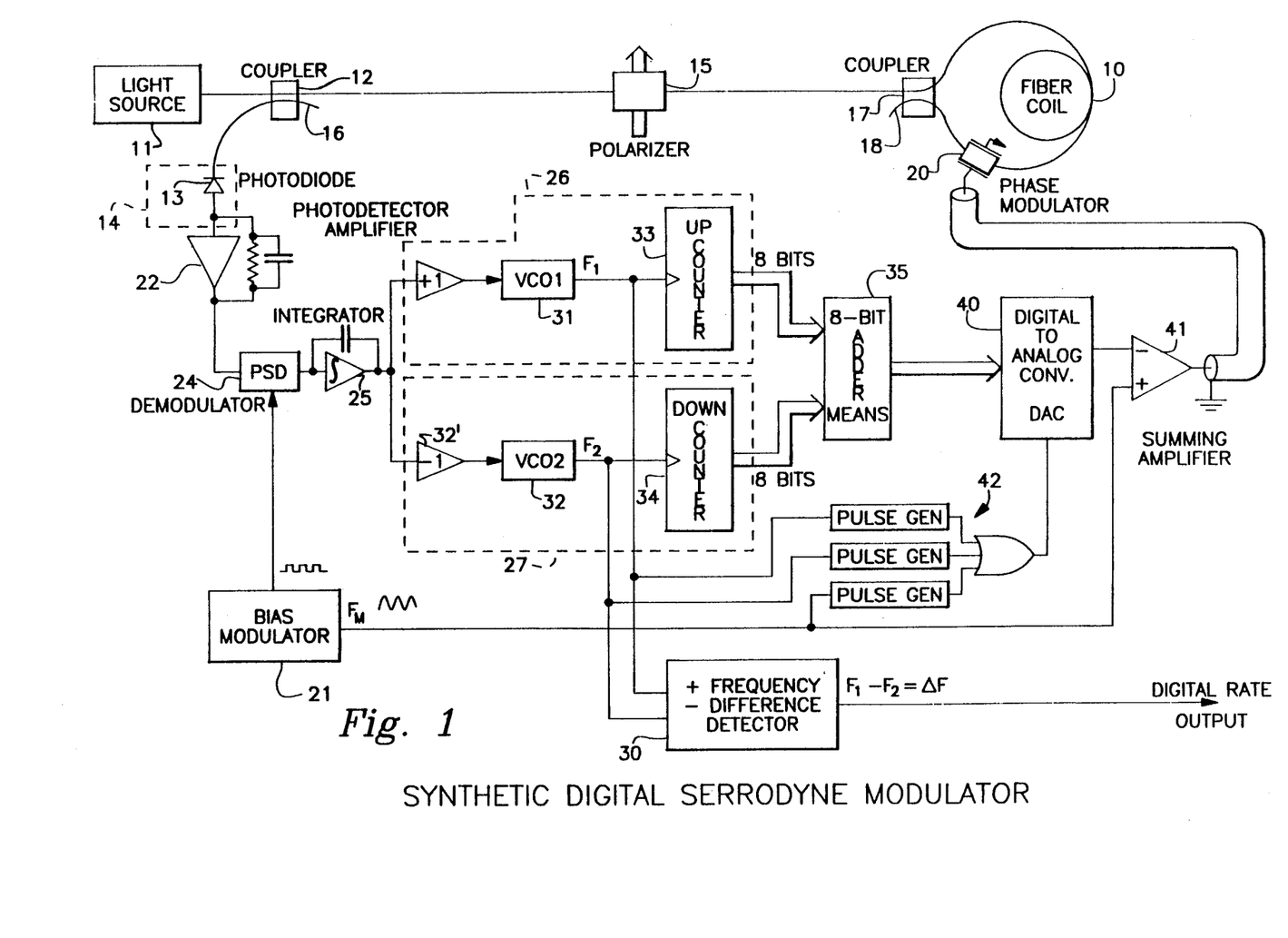
FIG. 1 is a block diagram of the digital synthetic serrodyne for fiber optic gyroscope.

Referring now to FIG. 1 there is shown a system diagram of a fiber optic gyroscope system according to the invention. A fiber optic coil 10 is wound on a spool with a typical length of the optical fiber coil on the order of 100 meters to 2000 meters. Electromagnetic (light) waves which propagate in opposite directions through coil 10 are provided from a light source 11. This light source is typically a broad-line width ($\Delta\lambda \approx 20$ nm) superradiant (sometimes called superluminescent) diode, typically emitting in the near-infrared portion of the spectrum (for example at a wavelength of 830 nm to 1500 nm).

Between light source 11 and fiber optic coil 10 there is shown an optical path arrangement formed by an extension of the ends of coil 10 to several optical coupling components 12, 13, 14, 15, 16, 17, 18 and 20 to be described below. A portion of the same kind of polarization-maintaining optical fiber as in coil 10 is positioned at source 11 to receive the light emission therefrom and extends to a first port of an optical directional coupler 12. Optical directional coupler 12 is of a type which has four ports, two on each end. At the other port on the same end of the coupler 12 there is shown a further optical fiber positioned against it and which extends to be positioned against a photodiode 13 which is electrically connected to a photodiode system 14. The photodiode 13 detects the light waves impinging thereon from the adjacent optical fiber and propagating from the coupler 12, and provides a photocurrent, which is a function of the impinging radiation.

Optical directional coupler 12 has another optical fiber against a port at the other end thereof which extends to a polarizer 15. At the other port on that same side of coupler 12 there is a nonreflective termination 16 including another portion of an optical fiber.

Directional optical coupler 12 in receiving light waves in any of its ports transmits such light so that approximately half appears at each of the two ports of coupler 12 on the end thereof opposite that end having the incoming port. No light is transmitted to the port which is on the same end of the coupler 12 as is the incoming light port.

Polarizer 15 has a port on either end thereof with light transmission media continued therein. Positioned against the port on the opposite end thereof opposite that connected to optical directional coupler 12 is another optical fiber portion which extends to a further optical bidirectional coupler 17 which has the same light transmission properties as does coupler 12.

The other port on the same end of coupler 17 from which a port is coupled to polarizer 15 is connected in a non-reflective termination 18 using a further optical fiber section. Now turning to the two ports on the other end of coupler 17, one is directly coupled to one end of the optical fiber in coil 10. The other port is connected to a phase modulator 20 in the optical path extending to the other end of the optical fiber in coil 10. The phase modulator 20 has two ports, one on either end of transmission media contained therein. The optical fiber from coil 10 is positioned against one port of phase modulator 20 and the optical fiber extending from coupler 17 is positioned against the opposite port to complete the optical path followed by light waves from source 11. The phase modulator, loop coupler and polarizer can take the form of a multifunction integrated optic chip if desired.

Phase modulator 20 is capable of receiving electrical signals from the phase difference controller to cause it to introduce a phase difference in light transmitted therethrough by changing the index of refraction of the transmission media therein to change the optical path length.

In operation, the light from source 11 is coupled through the optical fiber portion to optical directional coupler 12. Some of that light entering coupler 12 from source 11 is lost in non-reflective terminating arrangement 16, but the rest of that light is transmitted through polarizer 15 to optical directional coupler 17. Coupler 17 serves as a beam-splitter in that the light entering the port thereof received from polarizer 15 splits in half with one portion thereof passing out of each of the two ports on the opposite end. From the one port light passes through coil 10, through modulator 20 and back to coupler 17. There a portion of that returning light is lost in non-reflective arrangement 18, but the rest of that light passes through the other port of coupler 17 to polarizer 15 and to coupler 12 where a portion of it is transmitted to photodiode 13. The other part of the light from beam-splitter 17 leaving the other port thereof passes through modulator 20 and coil 10 to reenter coupler 17 and, again with a portion thereof following the same path as before the other portion to finally impinge on photodiode 13.

Photodiode 13 provides an output photocurrent proportional to the intensity of the two light waves impinging thereon to the phase difference controller circuit. The output photocurrent depends on the resulting optical intensity of the two waves incident on photodiode 13, which intensity will vary depending on the degree of constructive or destructive interference which occurs between the two light waves. This interference of waves will change with rotation of the coiled optical fiber 10 about its axis as such rotation introduces a phase difference between the waves.

The remainder of FIG. 1 shows in block diagram form a novel electrical system portion which forms a phase difference controller feedback loop from photodiode 13 to the optical path at optical phase modulator 20. Thus the output signal from photodetector system 14, including photodiode 13 is provided to a transimpedance amplifier 22, where it is amplified and passed to a phase sensitive demodulator (PSD) 24 serving as a phase detector. The PSD provides an indication of the relative phase of light waves impinging on the photodiode 13. Integrator 25 receives the output of PSD 24 and stores all error excursions at the output of the PSD and provides a countering output signal based upon the time integral of those errors. The integrator output signal causes a sufficient phase shift in the optical path through modulator 20 to provide zero error, or zero phase difference in the steady state resulting from a constant rotation rate.

The output signal from the integrator 25 is applied to the inputs of a positive serrodyne generator 26 and a negative serrodyne generator 27. The generator 26 comprises a voltage controlled oscillator (VCO) 31 and an "up" counter 33. The generator 27 comprises an inverter 32,, a voltage controlled oscillator 32 and a "down" counter 34. Initial frequencies of both of the VCO's may be at 15 MHz, for example. The output $F_1$ of VCO 31 and the output $F_2$ of VCO 32 are fed to the input of a frequency difference detector 30 which provides a digital rate output $\Delta F = F_1 - F_2$. Output $F_1$ is also connected to the input of "up" counter 33 and input $F_2$ is connected to the input of "down" counter 34.

The output of the two counters 33 and 34 is connected to the inputs of an 8-bit adder means 35. The adder means may comprise an adder or may comprise an adder #1 followed by an adder #2. The output of the adder means is connected to a digital-to-analog converter (DAC) 40. The output of the DAC 40 is connected through an amplifier 41 to the phase modulator 20. The bias modulator 21 provides proper signals to the PSD 24 and to the adder #2. If adder #2 is not included then the bias modulator signal is instead summed at summing amplifier 41. A strobe circuit 42 is connected to the DAC 40 to strobe the DAC anytime a transition occurs.

The operation of the electrical circuit operates as follows. The output of the integrator 25 which is non-zero when the gyro is rotated, is fed with opposite polarity to VCO 32 compared to VCO 31. This results in VCO 31 outputting a higher frequency than VCO 32. Thus counter 33 counts sequentially up faster than counter 34 counts sequentially down. The binary words out of the counters 33 and 34 ($\psi_u(t)$, $\psi_d(t)$) are applied to adder #1. The output of adder #1 ($\psi_1(t)$) is summed with the binary square wave modulation ($\psi_b(t)$) in adder #2. The output of adder #2 ($\psi_2(t)$) is converted in the digital-to-analog converter 40 to the analog serrodyne signal $\psi_3(t)$. Amplification is normally required with the more customary serrodyne signal $\psi(t)$ being applied to the phase modulator 20. Loop closure obtains since a phase ramp with the proper slope is applied.

Figure 3:
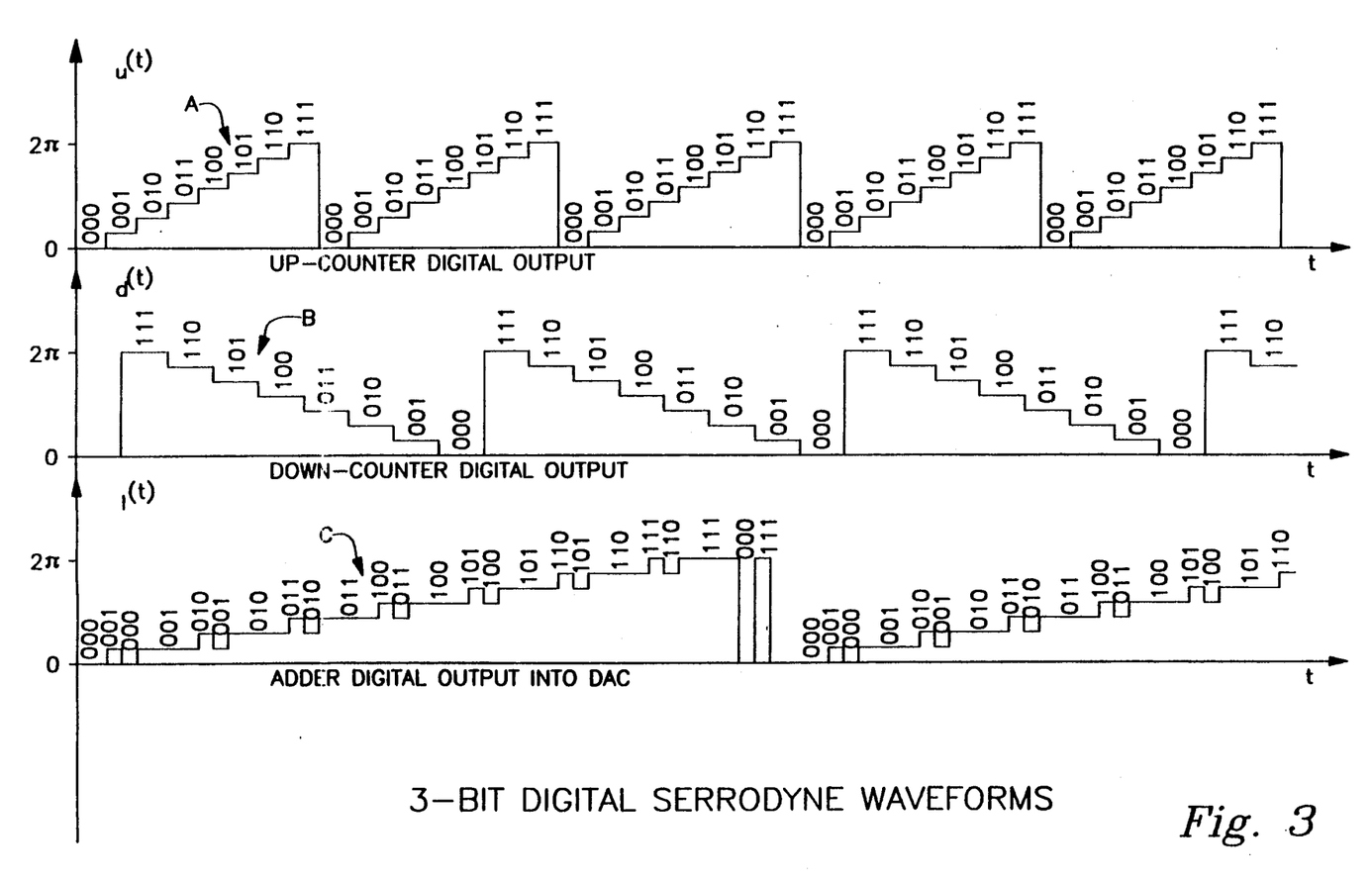
FIG. 3 shows symbolic waveforms of the digital outputs of the up counter, the down counter and the adder means of FIG. 1.

Referring now to FIG. 3 there are shown symbolic waveforms of the up-counter 33 digital output, the down-counter 34 digital output and the adder 35 digital output into the digital-to-analog converter (DAC) 40. The waveforms are referred to as symbolic because it will be appreciated that the serrodyne signals are digital words until the final digital to analog conversion. The equivalent analog signal is shown for representation only. In actuality the up and down counters may preferably be 8-bit (or higher) counters, however in the representative waveforms A, B and C of FIG. 3 a 3-bit digital synthetic serrodyne system has been shown. Thus in waveform A representing the "up" counter output, the progressive eight bits in the count from 000 up through 111 are shown and repeated five times. In waveform B representing the down counter output, the progressive eight bits stepping downward are shown and repeated about three times. These two counter outputs are added together in the adder means 35 and waveform C represents the adder means digital output into the DAC 40. It will be appreciated that the strobe circuit 42 causes the DAC to convert anytime an event occurs in the VCO's or bias modulation. This DAC timing pulse, which is necessarily of short duration, strobes the DAC the minimum times needed in order to prevent extra DAC glitches.

Figure 2:
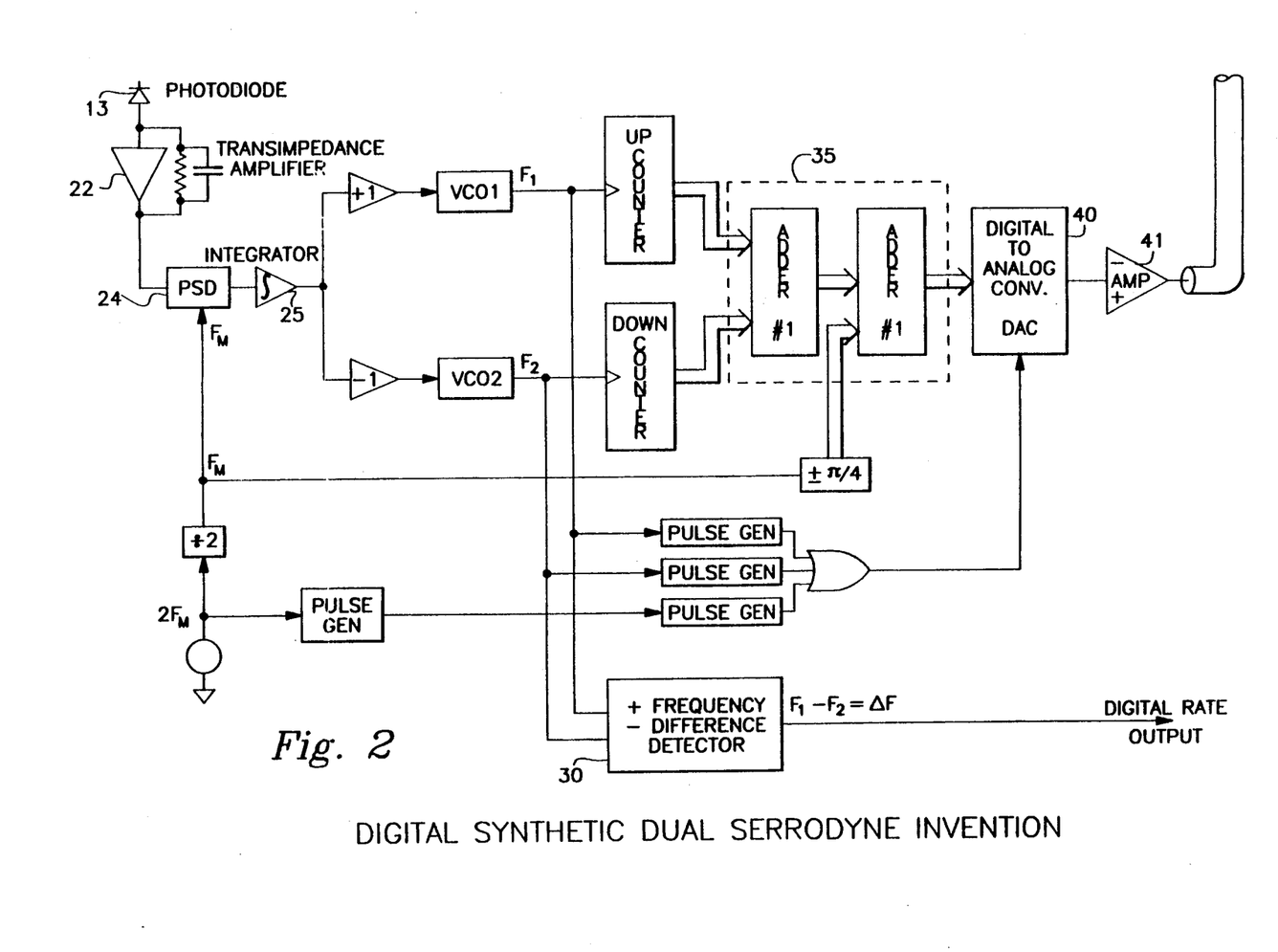
FIG. 2 is another block diagram embodiment in many ways similar to FIG. 1.

FIG. 2 shows an embodiment having two adders with the outputs of the counters 33 and 34 feeding the adder #1. The output of the adder #1 feeds one input of adder #2 and a bias modulation signal is inputted to the other input of adder #2, however, it is possible to eliminate adder #2 and the digital squarewave modulation. Then the bias, which can be sinusoidal or squarewave is summed into the amplifier 41 as shown in the embodiment of FIG. 1. This bias modulation can be applied in several equivalent ways using our basic approach.

Figures 4, 4C:
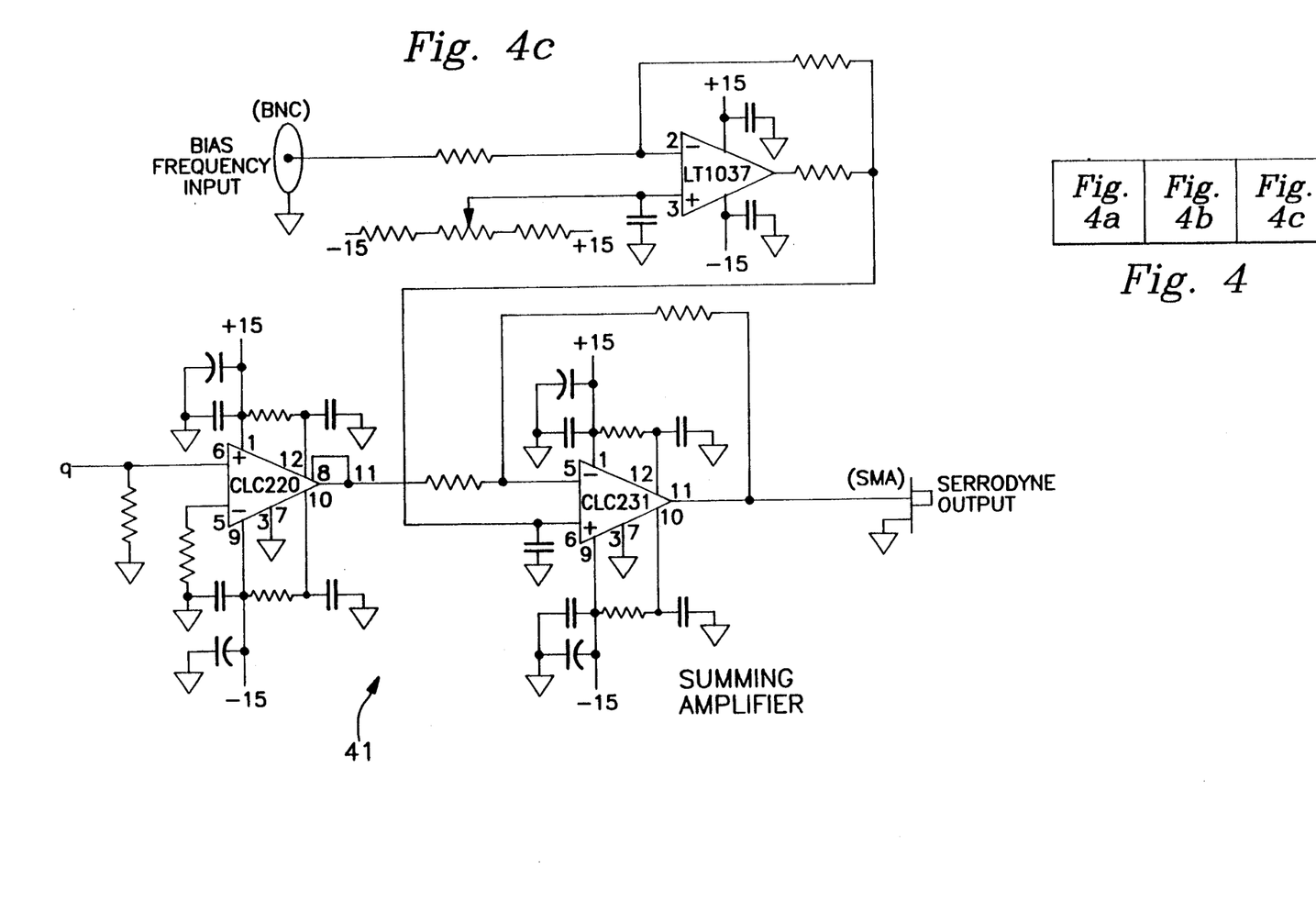
Figure 4A:
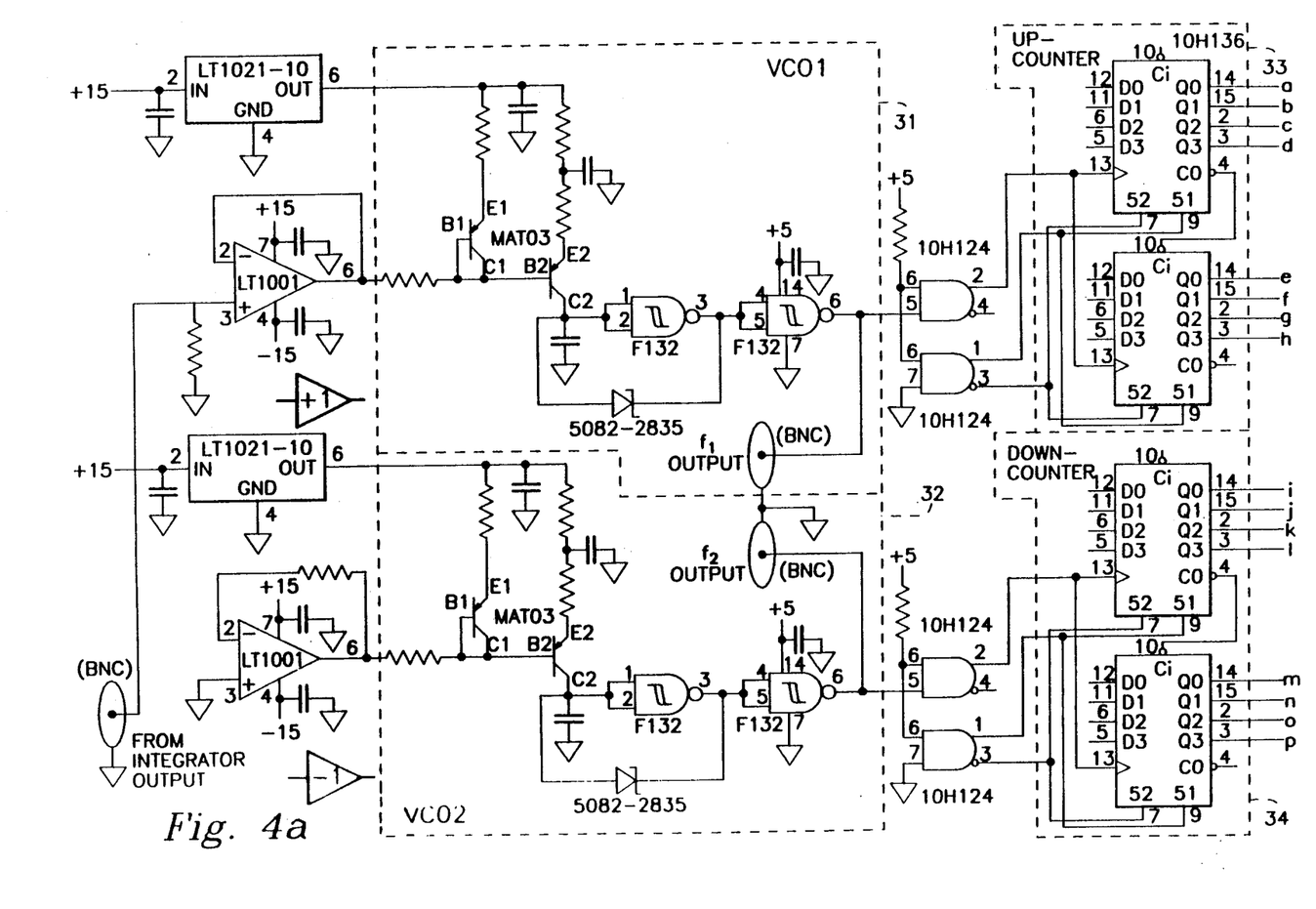
Figure 4B:
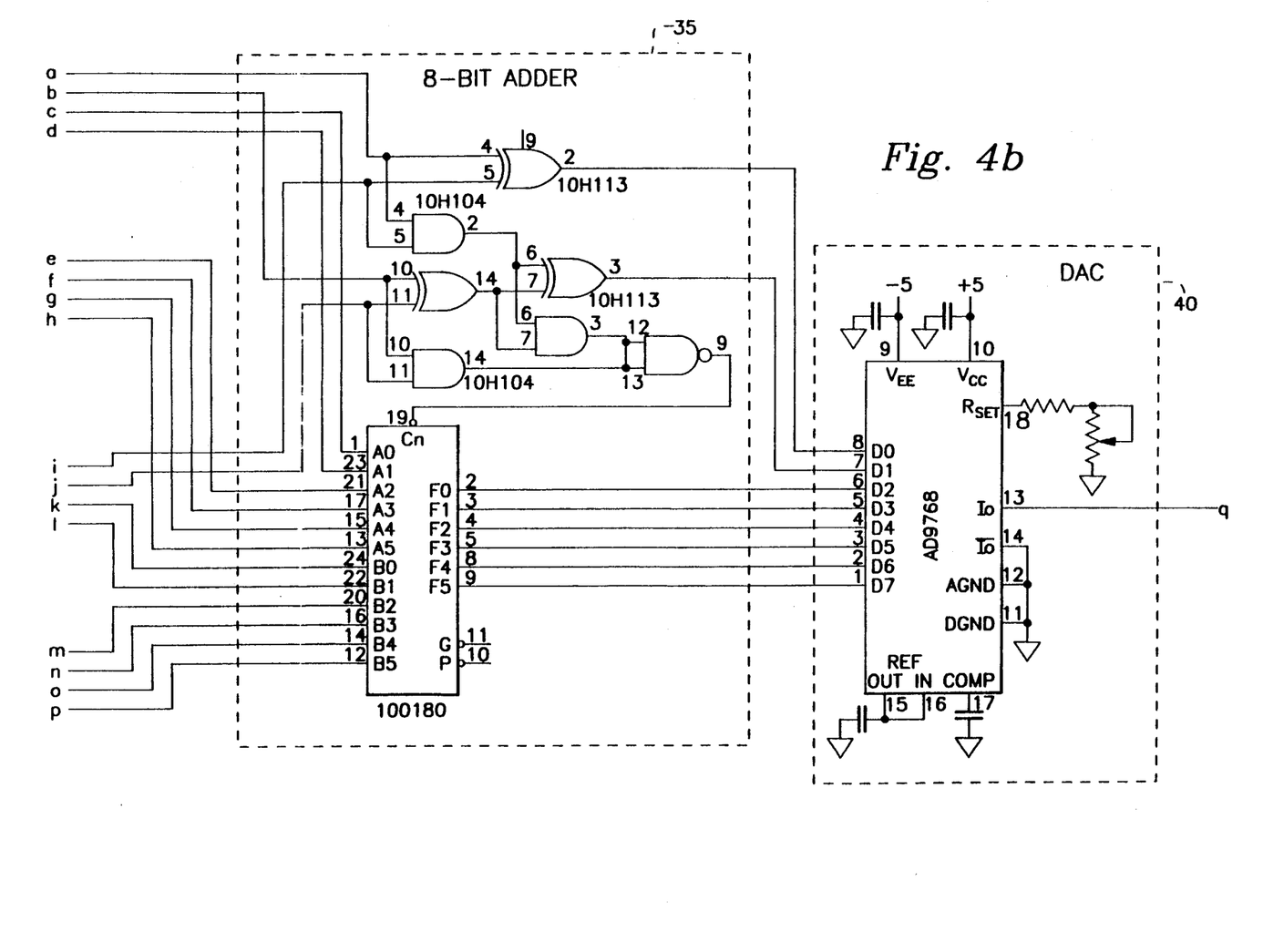

FIG. 4 comprising FIGS. 4a, b and c is one example of a schematic diagram of part of the electrical portion of the block diagram of FIG. 1. FIG. 4 includes a schematic of the VCO1 and VCO2, the up counter 33, the down counter 34, the 8-bit adder 35, the digital-to-analog converter 40 and the summing amplifier 41. Each of these sections of the circuit has been outlined with dashed line enclosures and numbered the same as in FIG. 1.

The invention disclosed herein has a number of advantages including:

a) Optimum reset time is achieved since only one op-amp (amplifier) is needed.

b) The digital approach is easier to productize since application specific integrated circuits can be applied. Cost and reproducibility issues are favorably affected.

c) Gyro bias and bias stability errors are not generated because baseband frequency shifting is employed.

d) There are no dynamic response problems at low rates since the novel digital waveform provides smooth baseband operation.

e) The single modulator design eliminates imperfect aging or temperature tracking problems associated with two modulators.

f) The applied frequency count indicates the applied rate to the gyro.

g) If a $2\pi$ phase deviation servo is required, a single servo loop suffices.

h) Bias modulation can be simply added either digitally (square wave modulation) or by analog (sinusoidal modulation) methods.

The embodiments of an invention in which an exclusive property or right is claimed are defined as follows:

1. A digital synthetic serrodyne phase difference controller for a rotation sensor capable of sensing rotation about an axis of a coiled optical fiber based on having a pair of electromagnetic waves propagating through said optical fiber in opposite directions to both impinge on a photodetector with a phase difference relationship therebetween. said digital synthetic serrodyne phase difference controller comprising:

a phase detector means having an input electrically connected to said photodetector to receive an output signal therefrom representative of phase differences occurring in pairs of electromagnetic waves impinging thereon, said phase detector means being capable of providing an output signal on an output thereof representative of both magnitude and direction of said phase differences indicated by said photodetector output signal;

a dual output generator means having an input electrically connected to said phase detector means output to receive said phase detector means output signal, said dual output generator means having first and second pluralities of outputs and being capable of providing a first plurality of digit output signals each at a corresponding one of said first plurality of outputs which signals together represent a succession of amplitude values and a second plurality of digit output signals each at a corresponding one of said second plurality of outputs which signals together represent a succession of amplitude values, said first plurality of digit output signals together having a basic set of successive amplitude values repeated at selected frequencies with said basic repetition set consisting of a relatively large fraction of said succession of amplitude values therein having substantially increasing magnitudes followed by a much smaller fraction thereof having substantially decreasing magnitudes, said second plurality of digit output signals together having a basic set of successive amplitude values repeated at selected frequencies with said basic repetition set consisting of a relatively large fraction of said succession of amplitude values having substantially decreasing magnitudes followed by a much smaller fraction thereof having substantially increasing magnitudes, said frequencies of repetition of said basic repetition sets in said first and second pluralities of output signals being determined by said phase detector means output signal;

a combination means having a plurality of inputs and a plurality of outputs and comprising a first digital adder means having a plurality of outputs on which corresponding ones of a plurality of digit output signals are provided thereby that can be a basis for a plurality of digit output signals provided at said combination means outputs, a first plurality of inputs serving as a portion of said combination means inputs each electrically connected to a corresponding one of said first plurality of outputs of said dual output generator means to receive said first plurality of digit output signals therefrom, and a second plurality of inputs serving as a portion of said combination means inputs each electrically connected to a corresponding one of said second plurality of outputs of said dual output generator means to receive said second plurality of digit output signals therefrom, said first digital adder means being capable of providing said plurality of digit output signals together representing a succession of amplitude values each having a magnitude representative of magnitudes of amplitude values in said dual output generator means first and second pluralities of digit output signals algebraically combined;

a digital-to-analog converter means having an output and a plurality of inputs each electrically connected to a corresponding one of said combination means plurality of outputs to receive said combination means plurality of digit output signals together representing a succession of amplitude values based at least in part on said first digital adder means plurality of digit output signals, said converter means providing an analog output signal at said output thereof representative of said succession of amplitude values in said combination plurality of digit output signals received; and a frequency translation means electrically connected to said digital-to-analog converter means output, said frequency translation means being positioned in a corresponding optical path portion selected from among those optical path portions taken by electromagnetic waves to reach or leave said coiled optical fiber enroute on an optical path to said photodetector in said rotation sensor to be capable of providing a frequency translation of any such electromagnetic wave passing therethrough in propagating along said optical path.

2. The apparatus of claim 1 wherein said dual output generator means first and second pluralities of output digit signals each are at selected initial basic set repetition frequencies if substantially no rotation is occurring about said axis of said coiled optical fiber, with said dual output generator means first plurality of output digit signals being at other basic set repetition frequencies if rotation is occurring about said axis of said coiled optical fiber.

3. The apparatus of claim 1 wherein there is also positioned in a said optical path portion a bias optical phase modulator capable of phase modulating any such electromagnetic waves passing therethrough in propagating along said optical path so as to provide a varying phase difference between such electromagnetic waves propagating through said coiled optical fiber in opposing directions.

4. The apparatus of claim 1 wherein said dual output signal generator means contains an integrating means which has an input thereof electrically connected to said dual output signal generator means input.

5. The apparatus of claim 1 wherein said dual output generator means comprises a pair of voltage controlled oscillator means, one having an input thereof electrically connected to said dual output signal generator means input and that one remaining having an input thereof electrically connected to said dual output signal generator means input through a polarity inverter, said pair of voltage controlled oscillator means each having an output electrically connected to an input of a corresponding digital counter means, each said digital counter means having a plurality of outputs electrically connected to one of said dual output generator means first and second pluralities of outputs.

6. The apparatus of claim 2 wherein said dual output generator means first and second pluralities of output signals both are at other basic set repetition frequencies than said initial basic set repetition frequencies if rotation is occurring about said axis of said coiled optical fiber.

7. The apparatus of claim 1 wherein said combination means further comprises a second digital adder means having a first plurality of inputs with said first digital adder means having said plurality of outputs thereof each electrically connected to a corresponding one of said first plurality of inputs of said second digital adder means.

8. The apparatus of claim 1 wherein said digital-to-analog converter means further comprises a conversion synchronizing means which permits said digital-to-analog converter means to provide changes in value in said analog output signal thereof only in correspondence with changes in said first and second pluralities of digit output signals.

9. The apparatus of claim 1 wherein said frequency translation means is an optical phase modulator.

10. The apparatus of claim 3 wherein said bias optical phase modulator receives a signal varying at a frequency from an output of a bias modulating signal generator, and said phase detector means also receives a signal from an output of said bias modulating signal generator also varying at a frequency.

11. The apparatus of claim 5 wherein each of said digital counter means provides a plurality of output digit signals on said plurality of outputs thereof with each such plurality of output signals together representing a succession of amplitude values, said amplitude values of each substantially changing in magnitude in opposite directions.

12. The apparatus of claim 6 wherein said dual output generator means comprises a pair of voltage controlled oscillator means, one having an input thereof electrically connected to said dual output signal generator means input and that one remaining having an input thereof electrically connected to said dual output signal generator means input through a polarity inverter, said pair of voltage controlled oscillator means each having an output electrically connected to an input of a corresponding digital counter means, each said digital counter means having a plurality of outputs electrically connected to one of said dual output generator means first and second pluralities of outputs.

13. The apparatus of claim 7 further comprising a bias modulating signal generator which provides a demodulating signal varying at a frequency to said phase detector means and which provides a plurality of digit signals together representing a succession of amplitude values having magnitudes cyclically varying at a frequency to a second plurality of inputs of said second digital adder means, said second digital adder means being capable of providing a plurality of digit output signals each at one of a corresponding one of a plurality of outputs thereof which signals together represent a succession of amplitude values each having a magnitude representative of magnitudes of amplitude values in said first digital adder means plurality of digit output signals and said bias modulating signal generator plurality of digit signals algebraically combined.

14. The apparatus of claim 10 wherein said bias modulator signal generator provides a sinusoidal output signal, and said signal received by said bias optical phase modulator has a frequency substantially identical to that frequency occurring in said signal received by said phase detector means.

15. The apparatus of claim 11 wherein said dual output signal generator means comprises an integrating means which has an input thereof electrically connected to said dual output signal generator means input and an output electrically connected to each of said inputs of said pair of voltage controlled oscillator means to thereby electrically connect them to said dual output signal generator means input.

16. The apparatus of claim 12 wherein each of said digital counter means provides a plurality of output digit signals on said plurality of outputs thereof with each such plurality of output signals together representing a succession of amplitude values, said amplitude values of each substantially changing in magnitude in opposite directions.

17. The apparatus of claim 13 wherein said cyclical magnitude frequency is substantially identical to that frequency occurring in said demodulating signal received by said phase detector means.

18. The apparatus of claim 16 wherein said dual output signal generator means comprises an integrating means which has an input thereof electrically connected to said dual output signal generator means input and an output electrically connected to each of said inputs of said pair of voltage controlled oscillator means to thereby electrically connect them to said dual output signal generator means input.

19. The apparatus of claim 10 wherein said digital-to-analog converter means further comprises a conversion synchronizing means which permits said digital-to-analog converter means to provide changes in value in said analog output signal thereof only in correspondence with the changes in said first and second pluralities of digit output signals and in said signal received by said bias optical phase modulator from said bias modulating signal generator.

* * * * *